L. SUMNER.
Band Cutter for Thrashing Machines.

No. 90,605.  
Patented May 25, 1869.

Witnesses.  
L. Hailer  
P. T. Dodge

Inventor.  
L. Sumner  
by Dodge & Munn  
his attys

United States Patent Office.

LEVI SUMNER, OF OSKALOOSA, IOWA.

Letters Patent No. 90,605, dated May 25, 1869.

---

IMPROVEMENT IN BAND-CUTTER FOR THRESHING-MACHINES.

---

The Schedule referred to in these Letters Patent and making part of the same.

---

*To all whom it may concern:*

Be it known that I, LEVI SUMNER, of Oskaloosa, in the county of Mahaska, and State of Iowa, have invented certain new and useful Improvements in Apparatus for Cutting Bands and Feeding Threshers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a device of novel construction, to be used for cutting the bands on bundles of grain, and automatically shaking, or spreading out the same, and feeding them into a threshing-machine, as hereinafter explained.

It is customary, in threshing grain by machinery, for one person to cut, or untie the bands on the bundles of grain, and then for another person to shake, or loosen up the grain composing the bundle, and feed it into the machine gradually, by hand.

The object of my invention is to do all this by machinery, and thereby to save labor.

Figure 2:
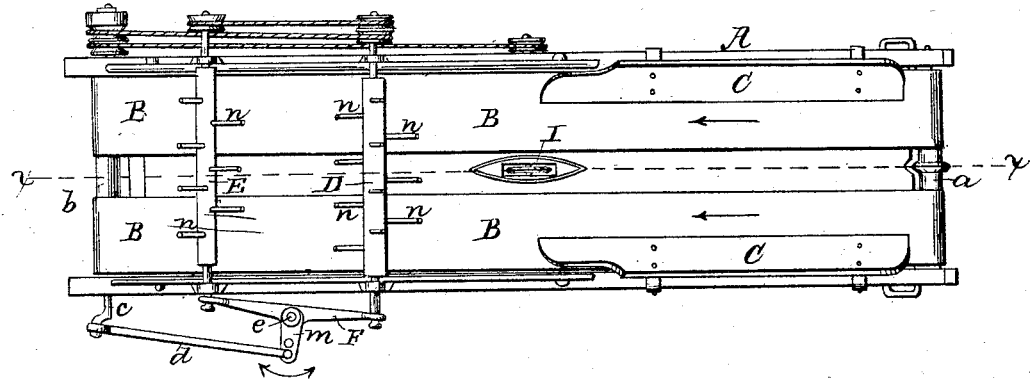
Figure 2 is a top plan view.

To do this, I construct a frame, A, having a bottom to it, with a roller, $a$, at one end, and a corresponding roller, $b$, at the opposite end, around which rollers I extend a couple of endless belts, or aprons, B, one near each side, with a space between them, as shown in fig. 2.

Figure 1:
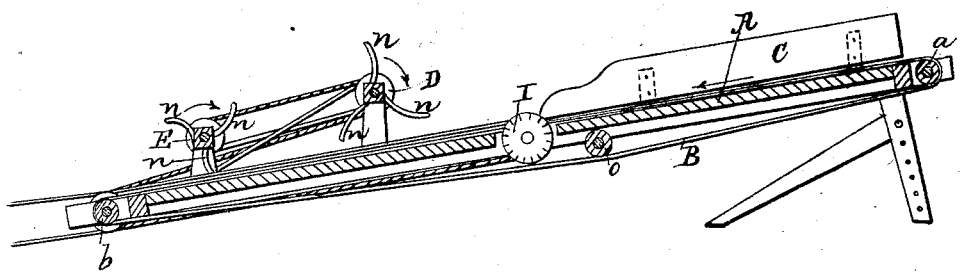
Figure 1 is a longitudinal vertical section on the line $x$–$x$ of fig. 2.

At each side, near the upper end, there is placed an inclined board, C, which thus forms a sort of hopper, or trough, to receive the bundle as it is thrown upon the frame at that point, and in the space between the belts B, at the centre of the frame, there is located a circular saw, or knife, I, secured upon a shaft under the bottom, the edge of the saw extending up through a slot in the bottom, as represented in figs. 1 and 2.

A short distance below the saw there is mounted, in suitable bearings, transversely of the frame, and above it, two shafts, D and E, both of which are provided with curved spikes, or arms $n$, as shown in the drawings. These shafts are so mounted in their bearings as to permit them to be moved to and fro lengthwise therein, and for the purpose of thus moving them, their journals, at one side, are connected to a double-elbow lever, F, pivoted at its centre, as represented at $e$, fig. 2, the arm $m$ of which is connected by a rod, $d$, to a crank, $c$, on the journal of roller $b$, as shown clearly in fig. 2.

The opposite ends of these shafts D and E, and also the roller $b$ and shaft of the saw I, are provided with pulleys, around which cords pass, for imparting motion to these various parts, and to the belts B, the whole being driven by any suitable connection with the threshing-machine.

The operation is as follows:

The apparatus being suitably located, with its body in an inclined position, as represented in fig. 1, and with its lower end at the mouth of the thresher, the bundles of grain are simply thrown, or laid lengthwise between the side-boards C, upon the belts B. The movement of the belts carries the bundle lengthwise along down the frame, and in so doing, the band is carried, or brought into contact with the saw, which, revolving rapidly, instantly severs the band, when the bundle falls apart, more or less, and is carried along under the shaft D, the arms of which tend to separate and shake out still more the bundle, the same operation being still further continued by the shaft E, as they move back and forth across the belts, while the grain is being carried along under them, their arms $n$ serving to assist in feeding the grain forward, as well as separating and shaking it out loose, in a fit condition to be fed into the machine, which last operation is performed as it passes from under the shaft E, and off of the lower end of the frame.

By this means I produce a very simple and efficient apparatus, which performs the entire operation automatically.

Having thus described my invention,

What I claim, is—

1. A band-cutting apparatus, consisting of the frame A, having the belts B arranged as described, with a saw, I, located beneath the frame, and having its periphery projecting through an opening therein, all as herein shown and described.

2. The shafts D E, provided with arms $n$, and arranged to have a reciprocating transverse and rotary motion combined, for separating, or spreading the bundle of grain, as set forth.

LEVI SUMNER.

Witnesses:
 W. W. HASKELL,
 DANIEL SUMNER.